United States Patent [19]

Taylor

[11] 4,159,053
[45] Jun. 26, 1979

[54] GRAIN DISTRIBUTOR

[75] Inventor: Edmund P. Taylor, Greencastle, Ind.

[73] Assignee: Bryant-Poff, Inc., Coatesville, Ind.

[21] Appl. No.: 872,616

[22] Filed: Jan. 26, 1978

[51] Int. Cl.² ........................................... B65G 11/12
[52] U.S. Cl. ................................................... 193/23
[58] Field of Search ...................... 193/15, 23; 302/27, 302/28; 214/17 CB; 222/533

[56] References Cited

U.S. PATENT DOCUMENTS

| | | | |
|---|---|---|---|
| 649,703 | 5/1900 | Moulton | 193/23 |
| 907,848 | 12/1908 | Morehouse | 193/23 |
| 993,167 | 5/1911 | Hoff | 193/23 |
| 1,224,241 | 5/1917 | Van Ness | 193/23 |
| 1,831,196 | 11/1931 | Read | 193/23 |
| 2,243,840 | 6/1941 | Delivuk | 193/23 |

Primary Examiner—Robert B. Reeves
Assistant Examiner—James L. Rowland
Attorney, Agent, or Firm—Barnes, Kisselle, Raisch & Choate

[57] ABSTRACT

A grain distributor for use with a bucket elevator. The distributor has an inlet at its upper end and an inner spout, the upper end of which is aligned with the inlet. The spout is inclined downwardly and is rotatable for aligning the lower end thereof with any one of a plurality of circularly arranged outlets at the lower end of the distributor. The spout is formed with a lower section which is adapted to be lifted out of and lowered into the distributor outlets.

4 Claims, 7 Drawing Figures

GRAIN DISTRIBUTOR

This invention relates to a grain distributor of the type frequently used with bucket elevators. Bucket elevators for grain frequently have an outlet for discharging grain into a distributor which in turn is designed to direct the grain to any one of a plurality of bins, dryers or other grain containers. Such grain distributors usually have a single inlet at the top and a plurality of circumferentially spaced outlets at the bottom. A single inner spout or chute is provided which extends downwardly from the inlet and which is rotatable about the central axis of the inlet for directing grain to any desired outlet. Each outlet is connected by an outer spout with a separate bin, dryer, etc.

In order to assure proper alignment of the inner spout with the desired outlet, the lower end of the inner spout is designed to project downwardly into the outlet a small distance (on the order of about ½ to ¾"). Therefore, when it is desired to rotate the inner spout to align it with a particular outlet, it becomes necessary to first raise the inner spout assembly to lift the lower end thereof from within the outlet. Since this lifting action is usually performed manually through a lift cable or the like, it is apparent that, with large capacity distributors, the manual force required to lift the entire spout assembly presents a serious problem.

The primary object of this invention is to eliminate the necessity of applying an excessively large manual force to lift the inner spout when it is desired to rotate it for discharge into another outlet.

The above object is achieved by forming the inner spout with a large upper section and a relatively smaller and lighter lower section vertically movable relative to the upper section. Both sections are mounted in the distributor for rotation as a unit. Thus, when it is desired to align the inner spout with another outlet, it is only necessary to lift the lighter and smaller lower section out of the outlet before rotating the entire assembly.

Further objects, features and advantages of the present invention will become apparent from the following description and accompanying drawings, in which.

Figure 1:
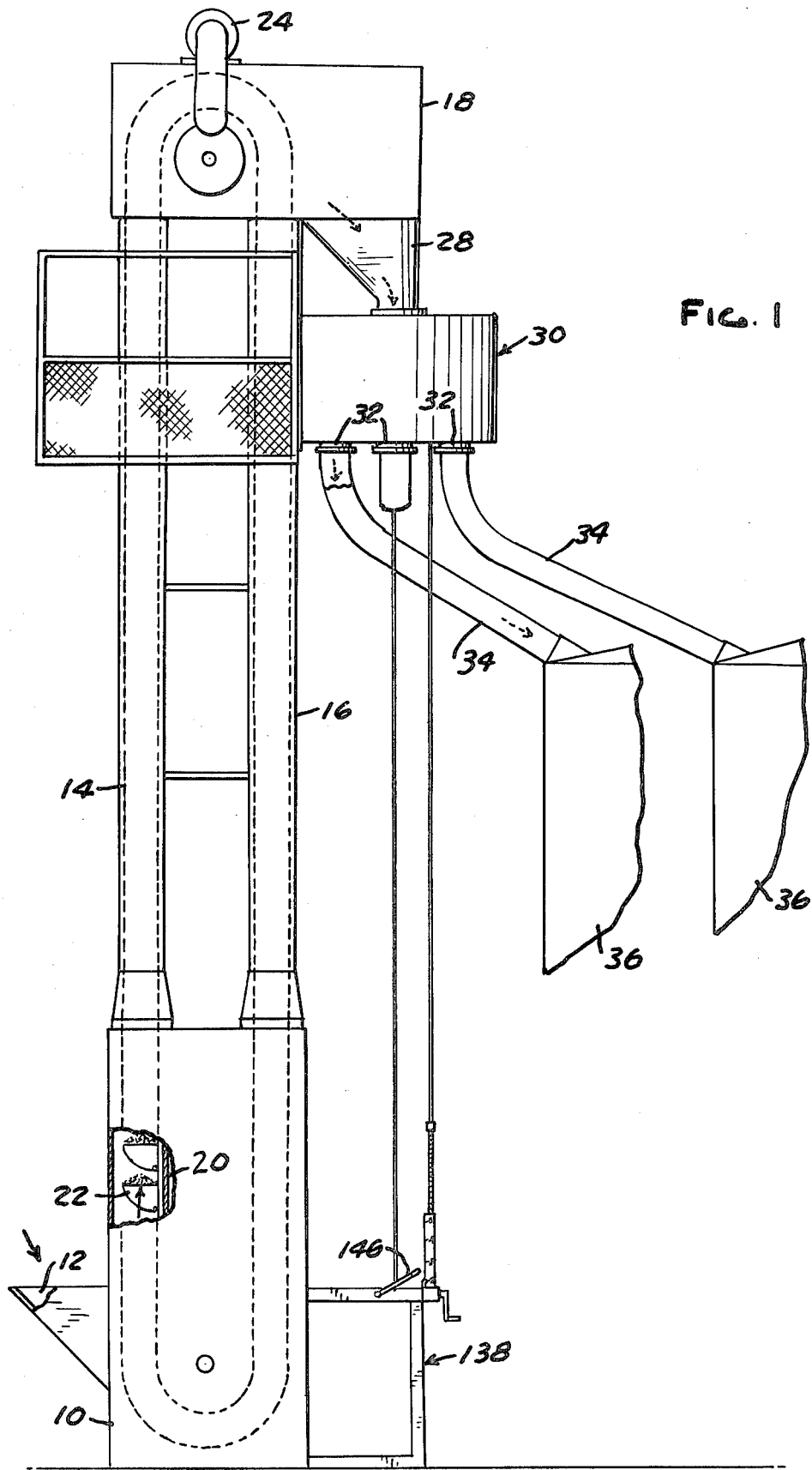
FIG. 1 is an elevational view of a bucket elevator provided with the grain distributor of this invention.

Referring to FIG. 1, there is illustrated a bucket elevator having a grain hopper 10 at the lower end thereof provided with a charging inlet 12. A pair of vertically extending hollow legs 14,16 are mounted on the upper end of hopper 10. A head casing 18 is mounted on the upper ends of legs 14,16. Pulleys (not shown) are journalled within hopper 10 and casing 18. An endless belt 20 having buckets 22 fastened thereto is trained around the two pulleys. Belt 20 is driven by a motor 24 and a suitable drive 26 so that the buckets 22 travel upwardly in leg 14 and downwardly in leg 16. As the buckets filled with grain from hopper 10 travel over the pulley in casing 18, they empty into a discharging fitting 28 which is connected to the grain distributor 30 to which the present invention is specifically directed. The lower end of grain distributor 30 is provided with a plurality of outlets 32, each connected by an individual spout 34 for directing the grain to a desired bin, dryer, etc. 36.

Figure 2:
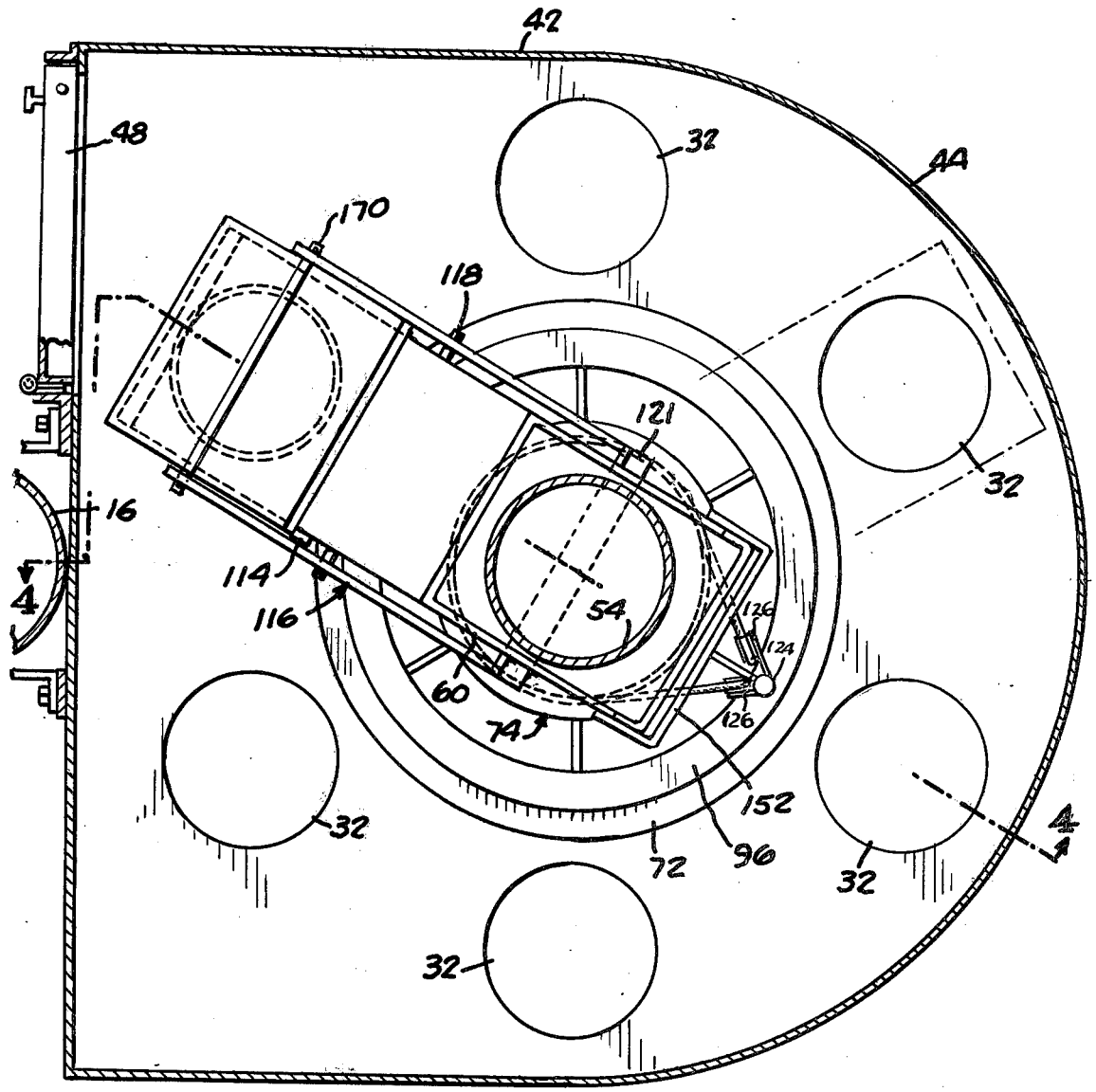
FIG. 2 is a top view of the grain distributor with the top wall thereof removed and taken along the line 2—2 in FIG. 4.
Figure 3:
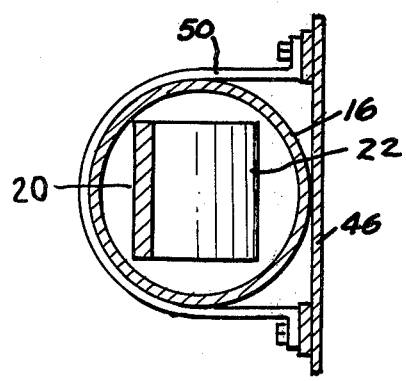
FIG. 3 is a fragmentary cross sectional view showing the manner in which the distributor is mounted on the bucket elevator.
Figure 4:
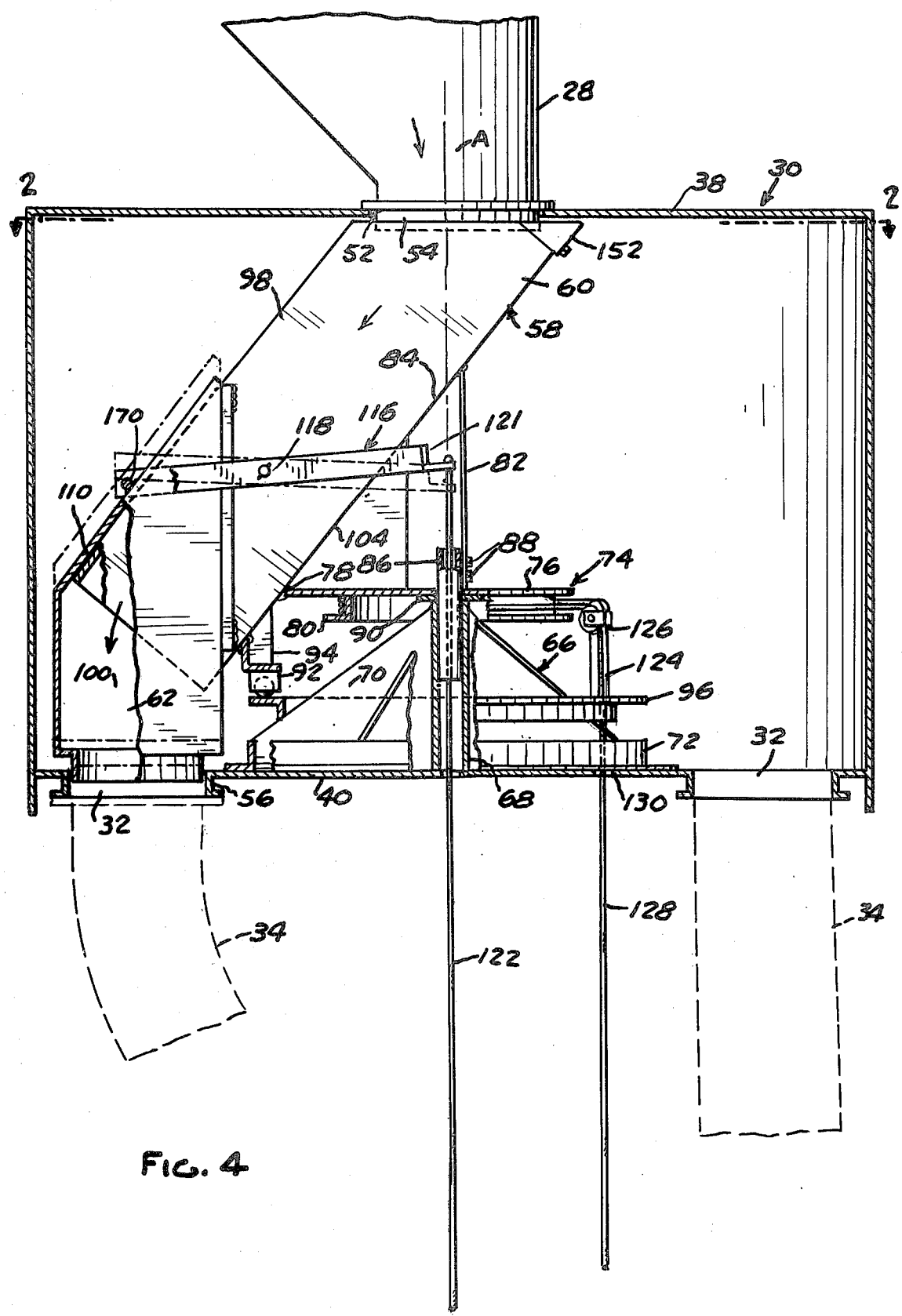
FIG. 4 is a vertical sectional view of the distributor along the line 4—4 in FIG. 2.

Referring now to FIGS. 2, 3 and 4, distributor 30 comprises a housing having a top wall 38, a bottom wall 40, a pair of side walls 42 connected at one end by a circular end wall 44 and connected at the other end by a flat end wall 46. These walls are suitably reinforced and provide a main support for the mechanism within the distributor housing. Wall 46 is provided with a hinged access door 48 adjacent one end thereof. Distributor 30 is mounted on the down leg 16 of the bucket elevator by straps 50 which are secured to the vertically central portion of the flat end wall 46 of the distributor housing.

Top wall 38 of the distributor housing is formed with a central inlet 52 through which the flanged lower end 54 of discharge fitting 28 projects. The outlets 32 on the bottom wall of the distributor housing are formed with a depending circular flange 56 by means of which the flanged outer spouts 34 are connected to the distributor. As shown in FIG. 2, outlets 32 are round apertures which are spaced circumferentially around the central vertical axis A of the inlet 52. Within the distributor housing there is arranged an inner spout generally designated 58 which comprises an upper section 60 and a lower section 62. Upper section 60 of spout 58 inclines downwardly and radially outwardly from the distributor inlet 52. Lower section 62 of spout 58 encloses the lower end portion of upper section 60 and extends vertically downwardly in alignment with the outlets 32. The lower end of lower section 62 is provided with a circular flange 64 adapted to project downwardly into the circular flange 56 around each outlet 32.

On the bottom wall 40 of the distributor housing there is arranged a support frame generally designated 66 which comprises a vertically disposed central hollow tube 68 which is reinforced by a plurality of radial gusset plates 70 and a circular iron plate 72. Tube 68 is aligned with the vertical axis of inlet 52. Inner spout 58 is supported on support frame 66. The means for supporting spout 58 on support frame 66 includes a reel 74 which consists of a top plate 76 welded to the upper section 60 of spout 58 as at 78. An angle iron ring 80 is welded to the underside of top plate 76. An upright plate 82 is welded to upper section 60 of spout 58 as at 84. The lower end of plate 82 is welded to the top plate 76 of reel 74 adjacent the center thereof. A hollow sleeve 86 is rotatably arranged within tube 68 and is secured by screws 88 to plate 82. Top plate 76 of reel 74 is supported on the upper end of tube 68 by means of a washer 90. With the arrangement described it will be appreciated that top plate 76 and the upright plate 82 cooperate with the hollow sleeve 86 to provide a firm support for rotating spout 58 on the upper end of tube 68. The entire assembly is stabilized by a ball caster 92 at the lower end of a bracket 94 welded to the upper spout section 60. Caster 92 is adapted to ride on a circular track 96 secured to the gusset plates 70.

Figure 5:
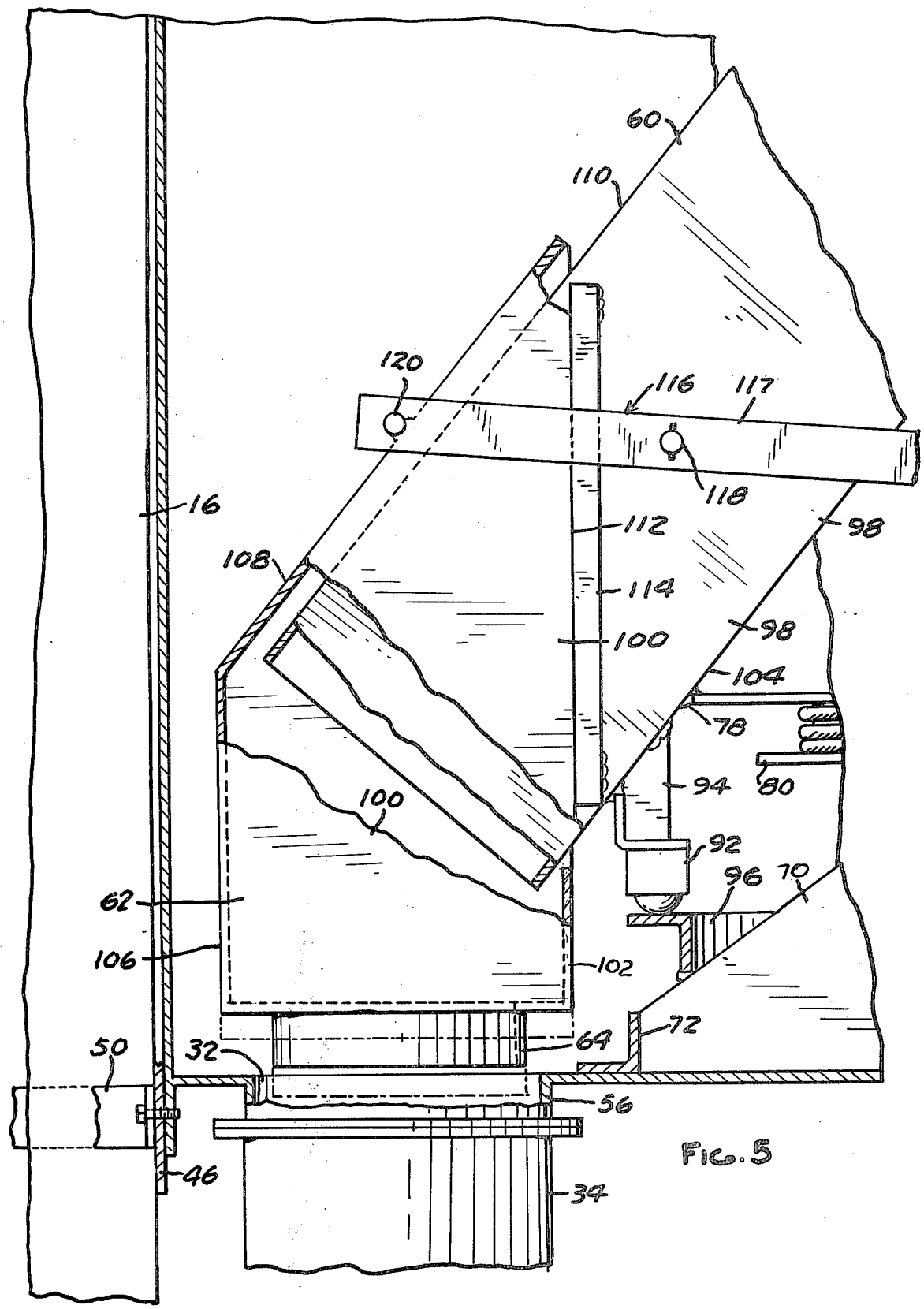
FIG. 5 is an enlarged sectional view of a portion of the distributor shown in FIG. 4 with parts broken away.

The upper and lower sections 60,62 of spout 58 are of rectangular cross section. The two opposite side walls 98 of upper section 60 extend downwardly between the two opposite side walls 100 of lower section 62. The radially inner end wall 102 of lower section 62 (FIG. 5) is relatively short, its upper edge terminating below the adjacent inclined bottom wall 104 of upper section 60. The radially outer end wall 106 of lower section 62 extends upwardly beyond the upper edge of end wall 102 and continues as an inclined top wall 108 of the lower section 62 which overlies the lower portion of the top wall 110 of the upper section 60. Thus, the lower end of upper section 60 is snugly nested within the upper end of lower section 62. The free radially inner edges 112 of the side walls 100 are engaged by vertical guide strips 114 on the side walls 98 of upper section 60. Guide strips 114 guide lower section 62 for vertical movement on upper section 60 of spout 58.

The means for raising and lowering lower section 62 includes a U-shaped lever 116. The two side legs 117 of lever 116 are pivotably supported on pins 118 welded to the two side walls 98 of upper section 60. The free ends of legs 117 are pivotably connected to pins 120 welded on the top wall 110 of lower section 60. The cross arm 121 forming the bight portion of lever 116 is attached to a vertical lifting cable 122 which extends downwardly through sleeve 86 and tube 68. With this arrangement it will be appreciated that, when cable 122 is pulled downwardly a slight amount, lever 116 will be rotated clockwise slightly (about 1") as viewed in FIGS. 4 and 5 to lift lower section 62 vertically sufficiently to elevate circular flange 64 out of outlet 32.

Figure 6:
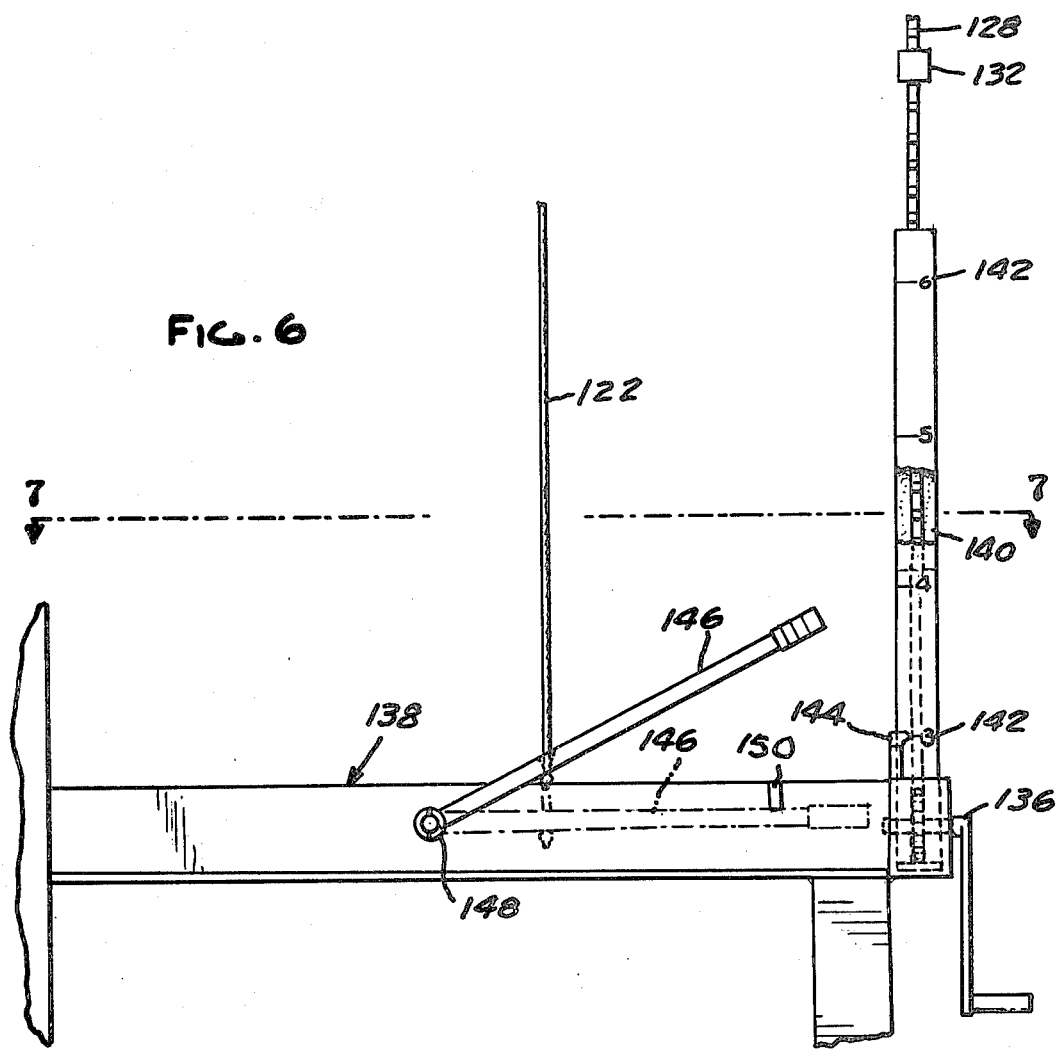
FIG. 6 is a fragmentary elevational view of the control mechanism for the distributor.
Figure 7:
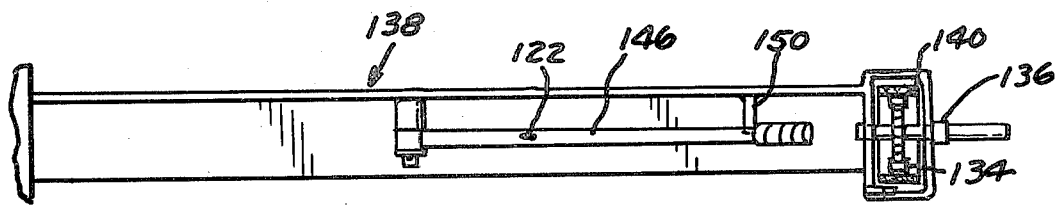
FIG. 7 is a view taken along the line 7—7 in FIG. 6.

A post 124 is securely mounted in an upright position on bottom wall 40 of distributor housing 30. Post 124 is preferably located within the circle defined by support track 96. A pair of pulleys 126 are secured to the upper end of post 124. A cable 128 is wrapped around reel 74 several times and has a portion thereof (not shown) fixedly clamped to the reel. The two runs of cable 128 are trained over pulleys 126 and then extend downwardly through openings 130 in bottom wall 40 of the distributor casing. The ends of cable 128 are connected as at 132 (FIGS. 1 and 6) to the opposite ends of the chain 134 which is trained around a windlass 136 mounted on a bracket 138 along side hopper 10. On the portion of chain 134 adjacent windlass 136 there is secured a fabric belt 140 with indicia 142 thereon spaced apart to designate the various outlets 32 in the bottom wall of the distributor casing. Thus, as windlass 136 is rotated a particular indicia 142 comes into alignment with a pointer 144 to indicate which of the various outlets the lower end of the inner spout is aligned with. A handle 146 is pivotally mounted on bracket 138 as at 148 and is connected to the lower end of cable 122. A latch 150 on bracket 138 is adapted to retain handle 146 in the downwardly pivoted position which corresponds to the vertically lifted position of lower section 62 of spout 58 as indicated in the solid lines in FIG. 5.

With the above-described construction it will be observed that the entire inner spout 58 and its support structure can be completely fabricated as a sub-assembly and thereafter assembled within the distributor casing as shown in FIG. 4. Spout 58 with the reel 74 welded thereto can be inserted into the casing of distributor 30 through the access door 48. Thereafter it can be displaced laterally to align the upper end of upper section 60 with inlet 52 and the lower section 62 with one of the outlets 32. To assist in this assembly there is provided at the upper end of upper section 60 a removable dust cover 152 which is applied to the upper section 60 after the spout is arranged in telescoping relation with flange 54 at the lower end of discharge fitting 28. Thereafter, sleeve 86, which was previously inserted in tube 68, is attached to the upright plate 82 so as to journal the entire spout assembly for rotation in a horizontal plane about the vertical axis of tube 68. Thereafter cables 122,128 are connected to the respective components to complete the assembly of the distributor.

I claim:

1. A grain distributor comprising a main support having a vertically extending inlet at its upper end and a series of outlets at its lower end spaced circumferentially around the axis of the inlet, said outlets opening vertically upwardly in a horizontal plane, an auxiliary support rotatably mounted on said main support for rotation in a generally horizontal plane about said axis, means for rotating said auxiliary support, a spout mounted on said auxiliary support for rotation therewith, said spout having an upper end aligned with said inlet and a lower end adapted to be aligned with each of said outlets in response to rotation of said auxiliary support, said spout comprising an upper section inclined downwardly from said inlet in a radially outward direction and a lower section extending upwardly from the outlets and communicating with the lower end of said upper section, said upper section being of rectangular cross section and having downwardly inclined top and bottom walls and a pair of side walls extending in laterally spaced vertical planes, said lower section also being of rectangular cross section and having a vertically extending central axis, said lower section having a pair of vertically extending side walls disposed directly adjacent and overlapping the outer faces of the lower end portions of said side walls of said upper section throughout the width thereof in vertically telescoping sliding relation and means on said auxiliary support for raising and lowering said lower section in a rectilinear vertical path relative to the upper section for retracting the lower end of the lower section in said vertical path from within an outlet with which it is aligned and for lowering it in said vertical path into another outlet after the auxiliary support has been rotated.

2. A grain distributor as called for in claim 1 including means fixed relative to said auxiliary support for guiding said lower section in said vertical path on said upper section.

3. A grain distributor as called for in claim 2 wherein the radially inner edges of the side walls of the lower spout section extend vertically, said guiding means comprising a pair of vertical guide strips attached one to each side wall of the upper section and engaging the vertically extending, radially inner edges of the side walls of the lower section.

4. A grain distributor as called for in claim 1 wherein said means for lowering and raising said lower section comprises a lever pivotally mounted between its ends in fixed relation to said auxiliary support for rotation about a horizontal axis, one end of said lever having force applying means connected thereto, the other end of said lever being connected to said lower section, the connection between said lever and said lower section lying in a vertical plane passing through the center of gravity of the lower section.

* * * * *